US012483299B2

(12) United States Patent
Yang et al.

(10) Patent No.: US 12,483,299 B2
(45) Date of Patent: Nov. 25, 2025

(54) COMMUNICATION WIDE-AREA COVERAGE SYSTEM AND METHOD BASED ON RECONFIGURABLE INTELLIGENT SURFACE TECHNOLOGY

(71) Applicants: TSINGHUA UNIVERSITY, Beijing (CN); Beijing Xingsheng Technology Co., Ltd., Beijing (CN)

(72) Inventors: Fan Yang, Beijing (CN); Shenheng Xu, Beijing (CN); Yezhen Li, Beijing (CN); Jiannian Zhang, Beijing (CN); Maokun Li, Beijing (CN)

(73) Assignees: TSINGHUA UNIVERSITY, Beijing (CN); BEIJING XINGSHENG TECHNOLOGY CO., LTD., Beijing (CN)

( * ) Notice: Subject to any disclaimer, the term of this patent is extended or adjusted under 35 U.S.C. 154(b) by 20 days.

(21) Appl. No.: 18/633,504

(22) Filed: Apr. 11, 2024

(65) Prior Publication Data
US 2025/0105883 A1    Mar. 27, 2025

(30) Foreign Application Priority Data

Sep. 26, 2023   (CN) .......................... 202311243487.1

(51) Int. Cl.
*H04B 7/0426* (2017.01)
*H04B 7/0408* (2017.01)

(52) U.S. Cl.
CPC ........... *H04B 7/043* (2013.01); *H04B 7/0408* (2013.01)

(58) Field of Classification Search
CPC ..... G01S 17/42; H04B 7/04013; H04B 7/043; H04B 7/0408; H04L 41/145
See application file for complete search history.

(56) References Cited

U.S. PATENT DOCUMENTS

2024/0283498 A1\*  8/2024  Li .............................. H01Q 3/30
2024/0421860 A1\*  12/2024 Wang .................... H04L 5/0051

FOREIGN PATENT DOCUMENTS

CN          111246496 A      6/2020
CN          113852979 A     12/2021
(Continued)

OTHER PUBLICATIONS

X. Hu, F. Gao, C. Zhong, Y. Zhang, X. Chen and Z. Zhang, "Location Information Aided Multiple Intelligent Reflecting Surface Systems," GLOBECOM 2020—2020 IEEE Global Communications Conference, Taipei, Taiwan, 2020, pp. 1-6. (Year: 2020).\*

(Continued)

*Primary Examiner* — Sophia Vlahos (57) ABSTRACT

The present disclosure provides a communication wide-area coverage system and method based on reconfigurable intelligent surface (RIS) technology. The system includes a RIS base station, a communication board, a controller, and a power supplier. The communication board communicates with a target cell to obtain a communication rate and position coordinates of a target coverage cell and feeds back the communication rate and position coordinates to the controller. The controller calculates a relative position between the target coverage cell and the RIS base station according to the obtained position information of the target coverage cell, and controls the RIS base station according to the relative position and the communication rate to generate a beam covering the target coverage cell. The RIS base station uses a RIS phased-array antenna integrated with an electronic device without requiring a radio-frequency transmitter and receiver (TR) component and a large number of phase shifting devices.

7 Claims, 4 Drawing Sheets

(56) References Cited

FOREIGN PATENT DOCUMENTS

| | | |
|---|---|---|
| CN | 116056210 A | 5/2023 |
| CN | 116405944 A | 7/2023 |
| WO | 2023075311 A1 | 5/2023 |
| WO | WO-2025041209 A1 * 2/2025 ........... H04B 7/0456 |

OTHER PUBLICATIONS

H. Hashida, Y. Kawamoto and N. Kato, "Intelligent Reflecting Surface Placement Optimization in Air-Ground Communication Networks Toward 6G," in IEEE Wireless Communications, vol. 27, No. 6, pp. 146-151, Dec. 2020. (Year: 2020).*

The Grant Notice from corresponding Chinese Application No. 202311243487.1, dated Nov. 10, 2023. English translation attached.

* cited by examiner

Obtaining, by the communication board, the position coordinates of the target coverage cell and the communication rate of the target coverage cell, and feeding back the position coordinates and the communication rate of the target coverage cell to the controller, the target coverage cell being a cell having a communication requirement — S410

Calculating, by the controller, the relative position between the target coverage cell and the RIS base station according to the position coordinates of the target coverage cell and the position coordinates of the RIS base station, the relative position including a distance and an angle — S420

Controlling, according to the relative position between the target coverage cell and the RIS base station and the communication rate of the target coverage cell, the RIS base station to generate a beam covering the target coverage cell — S430

COMMUNICATION WIDE-AREA COVERAGE SYSTEM AND METHOD BASED ON RECONFIGURABLE INTELLIGENT SURFACE TECHNOLOGY

CROSS-REFERENCE TO RELATED APPLICATIONS

This application claims priority to Chinese patent application No. 202311243487.1, filed with China National Intellectual Property Administration on Sep. 26, 2023, the entire disclosure of which is incorporated herein by reference.

FIELD

The present disclosure relates to the technical field of communications, and more particularly, to a communication wide-area coverage system and method based on reconfigurable intelligent surface (RIS) technology.

BACKGROUND

Long-distance, broadband, and mobile communication systems may perform high-quality and high-rate voice, video, and data transmission worldwide, thus facilitating the construction and development of an information society. It mainly includes modern mobile communication (4G/5G communication) and starlink communication of satellite networking.

A base station of modern mobile communication usually adopts large-scale MIMO technology, with a number of antenna units ranging from tens to even hundreds. Each antenna unit realizes phase shift through a transmitter and receiver (TR) component for communication base station capacity improvement and antenna beam forming functions. However, a large number of antennas and radio-frequency TR circuits are used at a base station end, which greatly increases complexity and design difficulty of a hardware system. Moreover, a radio-frequency TR assembly is high in cost and high in power consumption. In addition, a coverage range of an existing 5G base station is about 500 meters. For urban agglomerations and areas with high network traffic, a large number of dense configurations of base stations are needed to form high-density honeycomb coverage, resulting in the addition of significant construction and use costs. For remote areas, with low population density and data traffic, the cost of configurations and operation of base stations is very high, yielding a low input-output ratio. Consequently, the remote areas cannot be fully covered by 5G base stations, which restricts the development of base station mobile network technology in remote areas and impacts a network user experience for residents in the areas. Although satellite networking communication may provide broadband data transmission services with global coverage, it is high in construction costs, great in commercialization challenging, and complex in maintenance and management, requires all-weather and full-time monitoring, and has long operation and maintenance periods. Moreover, a ground equipment needs to be placed in an open geographic position, to ensure that signals of a satellite are received. Therefore, predetermined difficulty is brought to layout, operation and maintenance of the equipment.

Therefore, how to achieve low-cost and wide-range communication coverage is a technical problem to be urgently solved by a person in the art.

SUMMARY

In view of the above problems, embodiments of the present disclosure provide a communication wide-area coverage system and method based on reconfigurable intelligent surface (RIS) technology, to overcome the above-mentioned problems or at least partially solve the above-mentioned problems.

According to a first aspect of the embodiments of the present disclosure, a communication wide-area coverage system based on a RIS technology is disclosed. The system includes a RIS base station, a communication board, a controller, and a power supplier. A phased-array antenna of the RIS base station is composed of a plurality of RIS units that is arranged periodically, and is controlled by a controller to generate a beam covering a target coverage cell. The communication board is configured to obtain position coordinates of the target coverage cell, obtain a communication rate of the target coverage cell by establishing communication with the target coverage cell, and feed back the position coordinates and the communication rate of the target coverage cell to the controller. The controller is configured to calculate a relative position (such as the distance and angle) between the target coverage cell and the RIS base station according to the position coordinates of the target coverage cell and the position coordinates of the RIS base station, and control the RIS base station to generate the beam according to the relative position and the communication rate of the target coverage cell. The power supplier is configured to supply power to the controller, the RIS base station, and the communication board.

According to a second aspect of the embodiments of the present disclosure, a communication wide-area coverage method based on a RIS technology is disclosed. The method is applied in the communication wide-area coverage system based on the RIS technology as described according to the first aspect of the embodiments of the present disclosure. The method includes: obtaining, by the communication board, the position coordinates of the target coverage cell and the communication rate of the target coverage cell, and feeding back the position coordinates and the communication rate of the target coverage cell to the controller, the target coverage cell being a cell having a communication requirement; calculating, by the controller, the relative position between the target coverage cell and the RIS base station according to the position coordinates of the target coverage cell and the position coordinates of the RIS base station, the relative position including a distance and an angle; and controlling, according to the relative position between the target coverage cell and the RIS base station and the communication rate of the target coverage cell, the RIS base station to generate a beam covering the target coverage cell.

In another exemplary embodiment of the present disclosure, said controlling, according to the relative position between the target coverage cell and the RIS base station and the communication rate of the target coverage cell, the RIS base station to generate the beam covering the target coverage cell includes: controlling, in response to the relative position being smaller than a distance threshold or the communication rate being smaller than a rate threshold, the RIS base station to generate a wide beam; and controlling, in response to the relative position being greater than or equal to the distance threshold or the communication rate being greater than or equal to the rate threshold, the RIS base station to generate a narrow beam.

In another exemplary embodiment of the present disclosure, the method further includes: obtaining, by the communication board, the position coordinates and the communication rate of each of the plurality of target coverage cells, and feeding back, by the communication board, the position coordinates and the communication rate of each of the plurality of target coverage cells to the controller; calculating, by the controller, a relative position between each target coverage cell and the RIS base station according to the position coordinates of each target coverage cell and the position coordinates of the RIS base station; and controlling, according to different time slots based on the relative position between each target coverage cell and the RIS base station and the communication rate of each target coverage cell, the beam of the RIS base station to scan to different target coverage cells.

In another exemplary embodiment of the present disclosure, the method further includes: performing real-time detection, by the communication board, on a communication requirement of a non-target coverage cell; determining, in response to the non-target coverage cell having the communication requirement, the non-target coverage cell as the target coverage cell; feeding back the position coordinates and the communication rate of the target coverage cell to the controller; calculating, by the controller, the relative position between the target coverage cell and the RIS base station according to the position coordinates of the target coverage cell and the position coordinates of the RIS base station; and controlling, according to the relative position between the target coverage cell and the RIS base station and the communication requirement of the target coverage cell, the beam of the RIS base station to scan to the target coverage cell.

In another exemplary embodiment of the present disclosure, the method further includes: performing real-time detection, by the communication board, on the communication requirement of each target coverage cell; determining, in response to the target coverage cell requiring no communication, the target coverage cell as a non-target coverage cell, and feeding back the non-target coverage cell to the controller; and controlling, by the controller, the beam of the RIS base station to stop scanning to the non-target coverage cell.

In another exemplary embodiment of the present disclosure, the RIS base station includes a phased-array antenna composed of a plurality of RIS units that is arranged periodically. A phase of each RIS unit is adjusted according to the relative position between the target coverage cell and the RIS base station and the communication rate of the target coverage cell, to generate the beam covering the target coverage cell.

The embodiments of the present disclosure include the following advantages.

An existing communication method is small in coverage range, high in hardware cost, and large in radio-frequency power consumption. In addition, the configurations of stations in urban agglomerations are dense. Moreover, the number of base stations in remote areas is small. In this way, effective signal coverage cannot be achieved. For these problems, in the embodiments of the present disclosure, the communication wide-area coverage system based on RIS technology is provided. The communication board obtains the position coordinates and the communication rate of the target coverage cell, and feeds back the position and the communication rate of the target coverage cell to the controller. The controller calculates the relative position between the target coverage cell and the RIS base station according to the position coordinates of the target coverage cell and the position coordinates of the RIS base station, and controls the RIS base station according to the relative position and the communication rate, allowing the RIS base station to generate the beam covering the target coverage cell.

The RIS base station uses a RIS phased-array antenna integrated with an electronic device without the need for a radio-frequency transmitter and receiver (TR) component and a large number of phase shifting devices. Therefore, problems of high radio-frequency power consumption, high hardware cost, high operation and maintenance costs, large energy resource consumption, and the like are solved. Moreover, it is realized that a plurality of terminals in the target coverage cell is covered simultaneously by calculating the relative position between the RIS base station and the target coverage cell in real time and generating the beam covering the target coverage cell. In addition, a coverage beam is flexibly controlled according to the relative position and the communication rate requirement, thereby realizing wide-range and wide-area coverage. In addition, based on the method, the RIS base station is constructed in urban areas, such that signal enhancement can be effectively achieved. Moreover, the RIS base station is constructed in remote areas, such that long-distance network coverage can be achieved. Therefore, an arrangement density of the base station is greatly lowered. Moreover, the cost of construction and use of the base station is lowered.

BRIEF DESCRIPTION OF THE DRAWINGS

In order to more clearly explain technical solutions of embodiments of the present disclosure, drawings used in the description of the embodiments of the present disclosure are briefly described below. Obviously, the drawings as described below are merely some embodiments of the present disclosure. Based on these drawings, other drawings can be obtained by those skilled in the art without creative effort.

DETAILED DESCRIPTION

In order to make the above objects, features and advantages of the present disclosure more apparent and understandable, the technical solutions in the embodiments of the present disclosure will be clearly and completely described below with reference to the accompanying drawings of the embodiments of the present disclosure. Obviously, the embodiments described herein are only part of, rather than all of embodiments of the present disclosure. Based on the embodiments of the present disclosure, other embodiments obtained by those skilled in the art shall fall within scope of the present disclosure.

Figure 2:
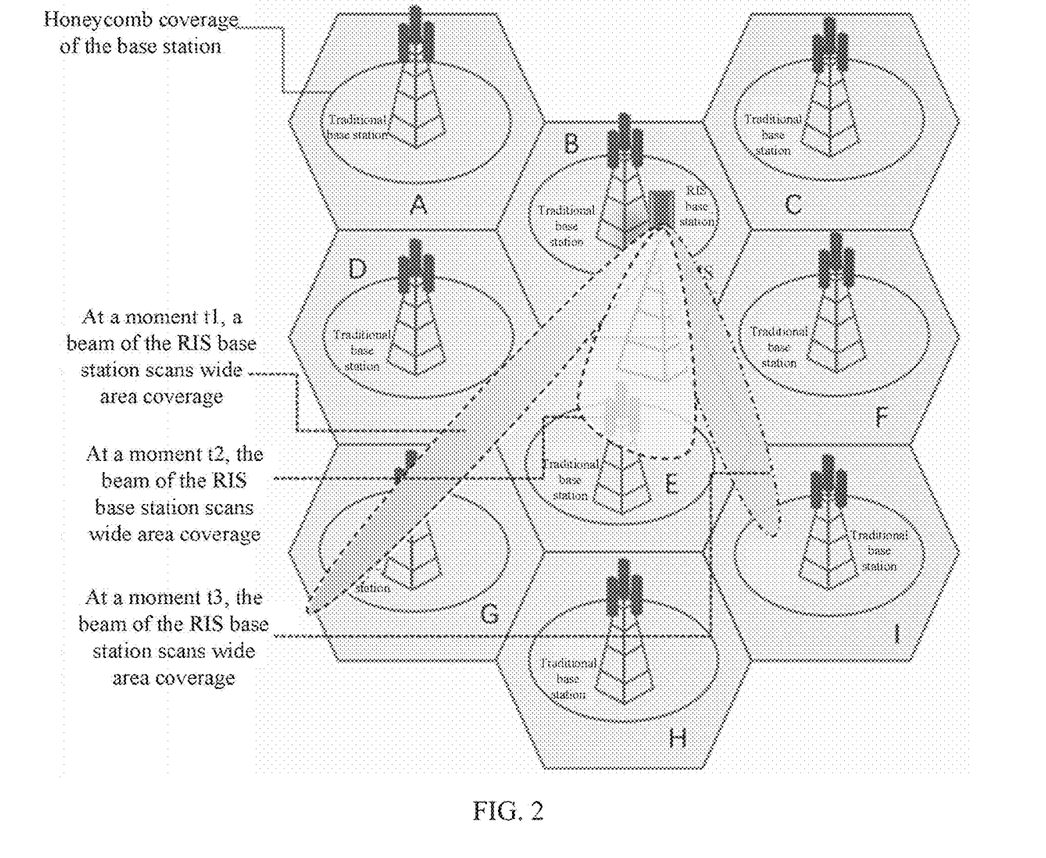
FIG. 2 is a schematic diagram of a comparison of conventional base station coverage and communication wide-area coverage based on a RIS technology provided according to an embodiment of the present disclosure.

In the related art, as illustrated in FIG. 2, a coverage range of a traditional base station is limited. Moreover, a great number of dense configurations of base stations are needed for urban agglomerations and areas with high network traffic, resulting in extremely high construction and use costs. However, remote areas are low in population density and data traffic, high in station configuration cost and operation cost, and low in an input-output ratio. In this way, the base station cannot completely cover remote areas, thereby restricting the development of base station mobile network technology in remote areas. Therefore, there are problems that an existing mobile communication system is small in coverage range, high in hardware cost, large in radio-frequency power consumption, problems that base stations are densely configured in urban agglomerations but are few in remote areas, thereby being unable to realize effective signal coverage, and the like. Moreover, satellite networking communication has the problems of high construction cost, long operation and maintenance cycles, high commercialization difficulty, and the like.

Aiming at these above problems, the applicant proposes the following technical concept. By using a base station antenna of reconfigurable intelligent surface (RIS) technology, a relative position between a target coverage cell and a RIS base station is calculated in real time. Further, the RIS base station is controlled according to the relative position to generate an antenna beam covering the target coverage cell. In this way, covering on the target coverage cell is realized. Meanwhile, effective communication number coverage is achieved by obtaining a communication rate requirement of the target coverage cell and adjusting beam performance according to a communication rate. Further, low-cost, wide-range, and wide-area coverage is achieved.

Figure 1:
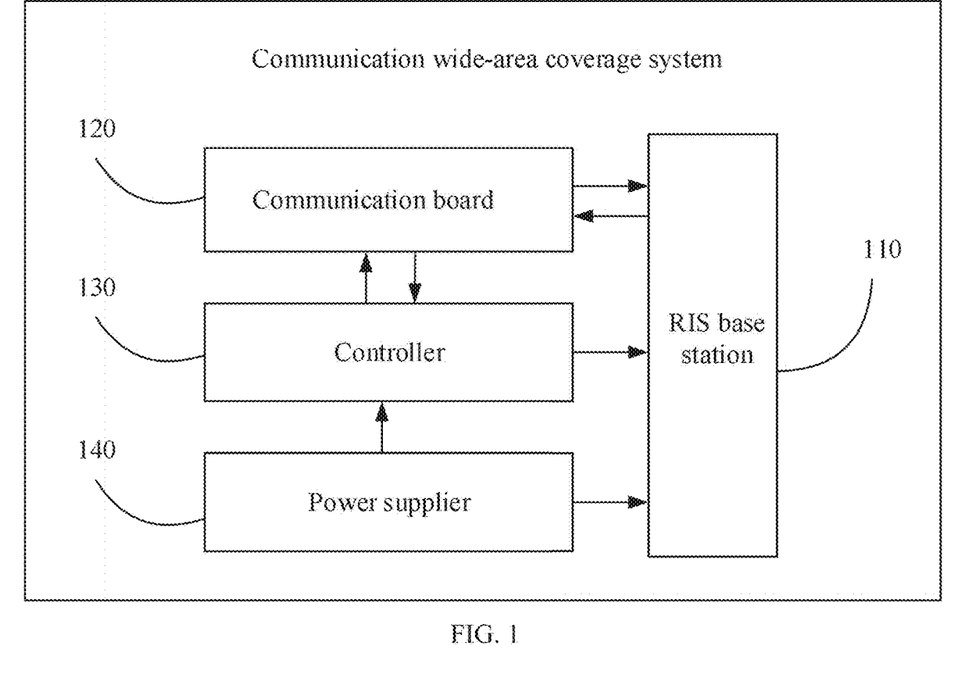
FIG. 1 is a schematic structural diagram of a communication wide-area coverage system based on reconfigurable intelligent surface (RIS) technology according to an embodiment of the present disclosure.

Based on the above technical concept, an embodiment of the present disclosure provides a communication wide-area coverage system based on reconfigurable intelligent surface (RIS) technology. FIG. 1 shows a schematic structural diagram of a communication wide-area coverage system based on a RIS technology. Referring to FIG. 1, the system includes a RIS base station 110, a communication board 120, a controller 130, and a power supplier 140.

A phased-array antenna of the RIS base station is composed of a plurality of RIS units that is arranged periodically, and is controlled by a controller to generate a beam covering a target coverage cell.

The communication board 120 is configured to obtain position coordinates and a communicate rate of the target coverage cell by establishing communication with the target coverage cell through automatic link establishment and beam tracking functions, and feed back the position coordinates and the communication rate of the target coverage cell to the controller.

The controller 130 is configured to calculate a relative position between the target coverage cell and the RIS base station according to the position coordinates of the target coverage cell, and control the RIS base station according to the relative position and the communication rate of the target coverage cell.

The power supplier 140 is configured to supply power to the controller, the RIS base station, and the communication board.

Figure 3:
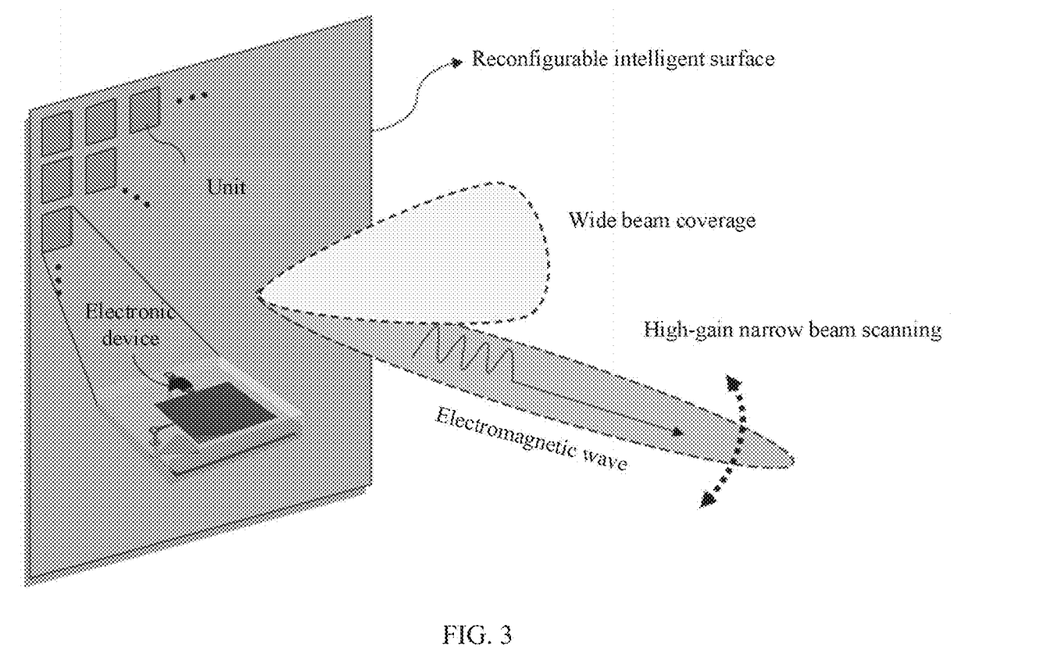
FIG. 3 is a schematic structural diagram of a phased-array antenna of a RIS base station according to an embodiment of the present disclosure.

In the embodiment of the present disclosure, communication wide-area coverage is realized based on the RIS base station 110 in cooperation with the communication board 120 and the controller 130. The RIS base station 110 is a base station designed based on the RIS technology. As illustrated in FIG. 3, the phased-array antenna of the RIS base station 110 is composed of the plurality of RIS units that is arranged periodically. An electronic device is integrated in each RIS unit. The controller 130 performs independent control on each RIS unit through the electronic device, thereby changing phased distribution of a RIS array antenna to generate the beam covering the target coverage cell. The communication board 120 has an automatic link establishment function, a beam tracking function, and a function of time-division communication between a plurality of communication boards. The communication board 120 is used for obtaining a target coverage cell having a communication requirement, obtaining the communication rate requirement for the target coverage cell by automatically establishing communication with the target coverage cell, and feeding back the communication rate and the position coordinates of the target coverage cell to the controller 130. After obtaining the position coordinates and the communication rate of the target coverage cell, the controller 130 calculates the relative position (i.e., an angle and distance) between the RIS base station and the target coverage cell. Further, the controller 130 controls the RIS base station 110 according to the relative position and the communication rate, i.e., a working state of the RIS unit is dynamically regulated in real time. In this way, a flexible radiation characteristic of the RIS phased-array antenna is realized. Moreover, the beam covering the target coverage cell is generated. For example, a high-gain focusing beam, a low-gain wide beam, a scanning beam, and a shaped-beam are formed. Furthermore, wide-range and wide-area coverage is achieved.

Since the RIS base station 110 adopts the RIS phased-array antenna integrated with the electronic device, characteristics like beam focusing, beam scanning, and beam forming can be realized without requiring a traditional transmitter and receiver (TR) component or phase shifter. In addition, the problems of large radio-frequency power consumption, high hardware cost, high operation and maintenance cost, large energy resource consumption, and the like are solved. Moreover, by calculating the relative position between the RIS base station and the target coverage cell in real time, the beam covering the target coverage cell is generated, so that a plurality of terminals in the target coverage cell is covered simultaneously. In addition, a coverage beam is flexibly controlled according to the relative position and the communication rate requirement, thereby realizing wide-range and wide-area coverage. Further, based on the method, the RIS base station is constructed in the urban area. In this way, signal enhancement can be effectively realized. The RIS base station is constructed in the remote area. In this way, long-distance network coverage can be realized. Therefore, an arrangement density of the base station is greatly lowered. In addition, the construction and use cost of the base station is lowered.

Figure 4:
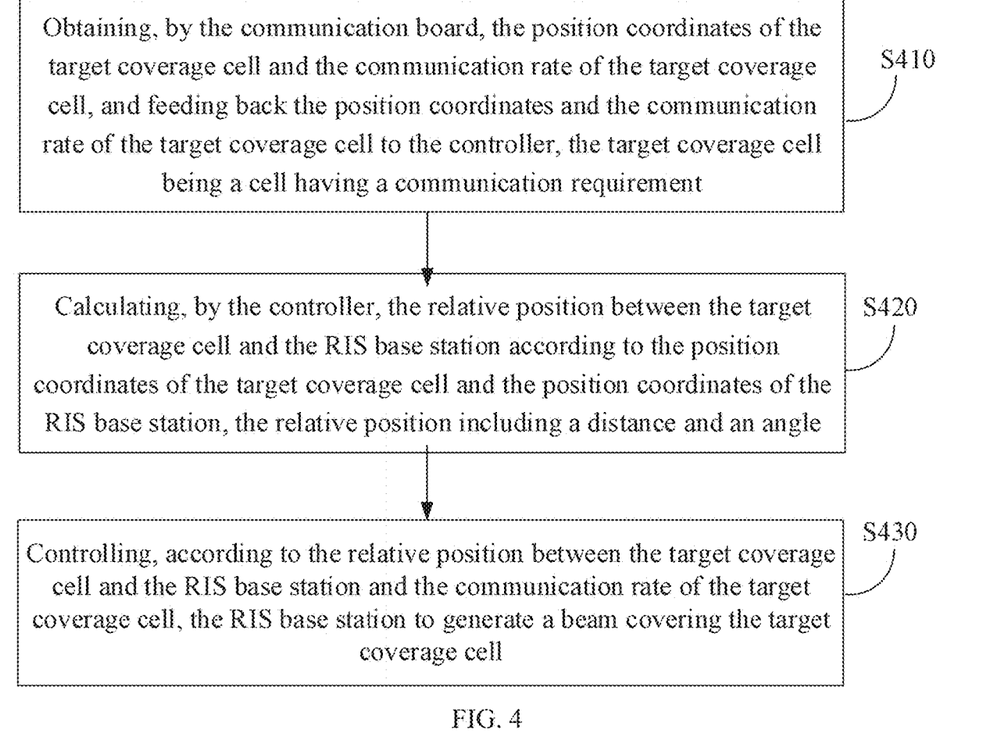
FIG. 4 is a step flowchart of a communication wide-area coverage method based on a RIS technology according to an embodiment of the present disclosure.

The embodiments of the present disclosure further provide a communication wide-area coverage method based on the RIS technology. FIG. 4 shows a step flowchart of a communication wide-area coverage method based on a RIS technology according to an embodiment of the present disclosure, which is applied to the communication wide-area coverage system based on the RIS technology as described according to the embodiments of the present disclosure. Referring to FIG. 4, the method specifically includes steps S410 to S430.

At S410, the position coordinates of the target coverage cell and the communication rate of the target coverage cell are obtained by the communication board, and the position coordinates and the communication rate of the target coverage cell are fed back to the controller. The target coverage cell is a cell having a communication requirement.

In the embodiment of the present disclosure, the communication board obtains the position coordinates of the target coverage cell having the communication requirement in real time, and obtains the communication rate of the target coverage cell by automatically establishing communication with the target coverage cell. The cell having the communication requirement refers to a terminal having the communication requirement in the cell. At least one terminal having the communication requirement is included in each target coverage cell. Moreover, the target coverage cell is not a cell at a fixed position and may be a cell having the communication requirement at any position. For example, as illustrated in FIG. 2, the target coverage cell may be any one of A cell, B cell, C cell, D cell, E cell, F cell, G cell, H cell, and I cell.

The communication rate refers to the total data transmission rates satisfying all the terminals with the communication requirement in the target coverage cell. By obtaining the communication rate of the target cell, adjustment on the beam performance of the RIS base station is facilitated according to the communication rate in subsequent steps, to achieve effective communication coverage satisfying communication requirements.

As S420, the relative position between the target coverage cell and the RIS base station is calculated by the controller according to the position coordinates of the target coverage cell and the position coordinates of the RIS base station. The relative position includes a distance and an angle.

In the embodiment of the present disclosure, the target coverage cell is any cell having the communication requirement, the position of the target cell is not fixed. Therefore, after obtaining the position coordinates of the target coverage cell, the relative position between the target coverage cell and the RIS base station needs to be calculated by the controller according to the position coordinates of the target coverage cell and the position coordinates of the RIS base station. The distance refers to a distance from the target coverage cell to the RIS base station, and the angle refers to a beam emission angle where the beam is emitted from the RIS base station to the target coverage cell. Further, the relative position between the target coverage cell and the RIS base station is calculated in real time. In this way, dynamical adjustment on the beam performance of the RIS base station is facilitated according to the relative position in subsequent steps. Therefore, a beam capable of covering the target coverage cell is generated.

At S430, the RIS base station is controlled according to the relative position between the target coverage cell and the RIS base station and the communication rate of the target coverage cell to generate a beam covering the target coverage cell.

In the embodiment of the present disclosure, beam performance required for communication coverage of the target coverage cells at different relative positions and with different communication rates is different. Therefore, the controller controls the phased-array antenna of the RIS base station to form a high-gain focusing beam, a low-gain wide beam, a scanning beam, and a shaped-beam, to realize effective coverage over the target coverage cell.

In an exemplary embodiment of the present disclosure, the controlling, according to the relative position between the target coverage cell and the RIS base station and the communication rate of the target coverage cell, the RIS base station to generate the beam covering the target coverage cell includes: controlling, in response to the relative position being smaller than a distance threshold or the communication rate being smaller than a rate threshold, the RIS base station to generate a wide beam; and controlling, in response to the relative position being greater than or equal to the distance threshold or the communication rate being greater than or equal to the rate threshold, the RIS base station to generate a narrow beam.

The wide beam and the narrow beam refer to the form of wavefront broadening and concentration of electromagnetic waves during their spatial propagation. The wide beam can realize wireless communication in a wider range. The narrow beam has a farther transmission distance and better quality of transmitted signals. The distance threshold refers to a maximum communication range that can be satisfied by the wide beam. Moreover, the communication coverage can be realized by using a wide beam with a low gain within a distance threshold range. The communication coverage can be realized only by using a narrow beam with a higher gain beyond the distance threshold. Similarly, the rate threshold refers to a maximum communication rate that can be satisfied by the wide beam. The data transmission requirement can be satisfied by using the wide beam with a lower gain within a rate threshold range. Only the narrow beam with a higher gain needs to be used for satisfying the data transmission requirement beyond the rate threshold.

In a specific implementation, when the relative position between the target coverage cell and the RIS base station is close (smaller than the distance threshold) or where the communication rate requirement is low (smaller than the rate threshold), the RIS base station is controlled to generate the wide beam to perform communication coverage on the target coverage cell. When the relative position between the target coverage cell and the RIS base station is far (greater than or equal to the distance threshold) or where the communication rate requirement is high (greater than or equal to the rate threshold), the RIS base station is controlled to generate the narrow beam to perform the communication coverage on the target coverage cell.

In an implementation, the controller controls the RIS base station in the following manners. The RIS base station includes a phased-array antenna composed of a plurality of RIS units that is arranged periodically. A phase of each RIS unit is adjusted according to the relative position between the target coverage cell and the RIS base station and the communication rate of the target coverage cell, to generate the beam covering the target coverage cell.

In an exemplary embodiment, based on a fast beam scanning function of the phased-array antenna of the RIS base station, communication with different coverage cells is performed at different times, thereby realizing wide-area coverage on a cell covered by a plurality of original base stations by using one RIS base station. In an exemplary embodiment of the present disclosure, the method further includes steps A1 to A3.

At A1, the communication board obtains the position coordinates of each of a plurality of target coverage cells and the communication rate of each of the plurality of target coverage cells and feeds back the position coordinates and the communication rate of each of the plurality of target coverage cells to the controller.

At A2, a relative position between each target coverage cell and the RIS base station is calculated by the controller according to the position coordinates of each target coverage cell and the position coordinates of the RIS base station.

At A3, the beam of the RIS base station is controlled according to different time slots based on the relative position between each target coverage cell and the RIS base station and the communication rate of each target coverage cell, to scan to different target coverage cells.

In the embodiment of the present disclosure, position coordinates of a plurality of target coverage cells with communication requirements are obtained. Moreover, at least one terminal having the communication requirement is included in each target coverage cell. As illustrated in FIG. 2, the target coverage cells may be any several cells among A cell, B cell, C cell, D cell, E cell, F cell, G cell, H cell, and I cell, for example, the G cell, H cell, and I cell. After obtaining the position coordinates of the target coverage cell, the communication board automatically establishes communication with the target coverage cell, and further obtains the communication rate of the target coverage cell, to facilitate the adjustment on the beam performance of the RIS base station according to the communication rate of each target coverage cell, thereby realizing effective communication signal coverage. In addition, the positions of target coverage cells are each different. In this way, the relative positions (distance and angle) between each target coverage cell and the RIS base station need to be calculated in sequence. Further, the beam of the RIS base station is controlled according to the relative position between each target coverage cell and the RIS base station and the communication rate of the target coverage cell, to scan to different target coverage cells. Furthermore, a communication manner of combining time division and space division is realized. Therefore, the communication coverage is provided for the plurality of target coverage cells, to cover different target coverage cells or different terminals of the same target coverage cell.

Figure 5:
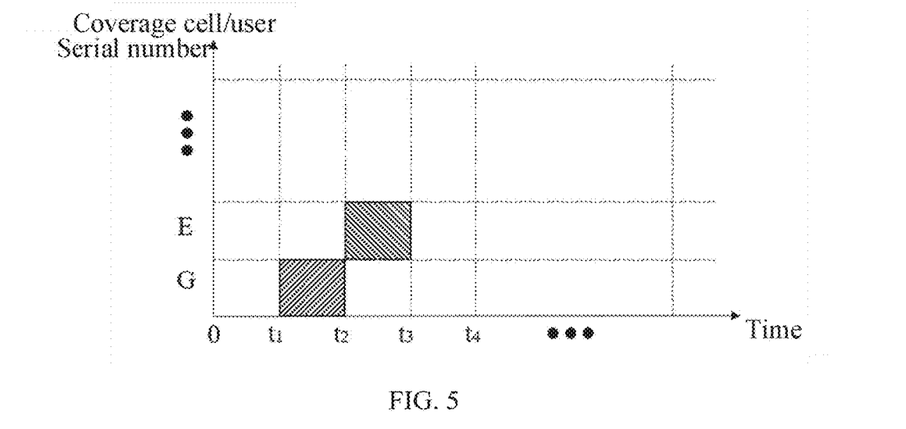
FIG. 5 is a schematic diagram of a "time-cell" correspondence of a beam scanning and covering communication area according to an embodiment of the present disclosure.

For example, in combination with FIG. 2 and FIG. 5, provided are specific descriptions where the wide-area coverage method is implemented in the communication manner of combining time division and space division in the embodiments of the present disclosure. At a moment t1, the RIS base station performs communication coverage on the G cell. By calculating a relative position between the terminal of the G cell and the RIS base station and obtaining a communication rate requirement of the G cell, the beam performance of the RIS phased-array antenna is adjusted according to the relative position and the communication rate. Since a distance between the G cell and the RIS base station is long, the RIS phased-array antenna is controlled to generate a corresponding high-gain narrow beam to cover the G cell. At a moment t2, an antenna beam of the RIS base station is scanned to the E cell. In addition, a relative position between the E cell and the RIS base station is calculated through positioning, and a communication rate requirement of the E cell is obtained. As a distance between the E cell and the RIS base station is small, the RIS phased-array antenna is controlled to generate a low-gain wide beam to cover the E cell. Further, at different times, the phased-array antenna of the RIS base station performs fast beam scanning on the plurality of target coverage cells and the plurality of terminals in the target coverage cell, thereby realizing wide-area coverage.

In the embodiment of the present disclosure, through the fast beam scanning function of the phased-array antenna of the RIS base station, the communication with different coverage cells at different times is performed. In this way, the cell covered by the plurality of original base stations uses one RIS base station to implement the wide-area coverage. Moreover, according to the relative position between the RIS base station and the target coverage cell and the communication rate requirement of the target coverage cell, the RIS base station antenna automatically adjusts the beam performance. When the distance between the target coverage cell and the RIS base station is close or the communication rate is low, the wide beam is generated to achieve area coverage. Moreover, when the distance between the target coverage cell and the base station is far or the communication rate is high, the high-gain narrow beam is generated to achieve beam scanning coverage.

In an exemplary embodiment, in a process of controlling the beam of the RIS base station to sequentially scan to different target coverage cells, it is detected that whether other non-target coverage cells have communication requirements in real time. Moreover, the coverage cell with the communication requirement is scanned and covered. In an exemplary embodiment of the present disclosure, the method further includes steps B1 to B 4.

At B1, real-time detection is performed by the communication board on a communication requirement of a non-target coverage cell.

At B2, in response to the non-target coverage cell having the communication requirement, the non-target coverage cell is determined as the target coverage cell.

At B3, the relative position between the target coverage cell and the RIS base station is calculated by the controller according to the position coordinates of the target coverage cell and the position coordinates of the RIS base station.

At B4, the beam of the RIS base station is controlled according to the relative position between the target coverage cell and the RIS base station and the communication requirement of the target coverage cell, to scan to the target coverage cell.

In the embodiment of the present disclosure, when communication coverage is provided for the plurality of target coverage cells based on the communication manner where the time division and space division are combined, the communication board further detects communication requirements of other non-target coverage cells to obtain whether to occur other cells that need to be performed communication coverage. Therefore, the communication coverage is provided for all terminals that need to perform communication according to actual requirements.

For example, in combination with FIG. 2, the method in the embodiments of the present disclosure is described. When the target coverage cell covered by the current beam includes the A cell, the D cell, and the G cell, in a process of controlling the beam of the RIS base station to sequentially scan to the A cell, the D cell, and the G cell according to a predetermined time interval, it is also detected whether other B cell, C cell, E cell, F cell, H cell, and I cell have communication requirements in real time. When it is found that the H cell has the communication requirement, the beam of the RIS base station is controlled, according to a communication rate of the H cell and a relative position between the H cell and the RIS base station, to scan to the H cell. At this time, the cell covered by the RIS has A cell, D cell, G cell, and H cell.

In an exemplary embodiment, in the process of controlling the beam of the RIS base station to sequentially scan to different target coverage cells, it is detected that whether the target coverage cell needs to continue to communicate in real time. Moreover, the communication coverage is stopped for a cell that requires no continuous communication, to save coverage resources. In an exemplary embodiment of the present disclosure, the method further includes steps C1 to C3.

At C1, real-time detection is performed by the communication board on the communication requirement of each target coverage cell.

At C2, in response to the target coverage cell requiring no communication, the target coverage cell is determined as a non-target coverage cell, and the non-target coverage cell is fed back to the controller.

At C3, the beam of the RIS base station is controlled by the controller to stop scanning to the non-target coverage cell.

For example, in combination with FIG. 2, the method in the embodiments of the present disclosure is described. When the target coverage cell covered by the current beam includes the A cell, the D cell, the G cell, and the H cell, in the process of controlling the beam of the RIS base station to sequentially scan to the A cell, the D cell, the G cell, and the H cell according to the predetermined time interval, it is detected that whether the terminal in the A cell, the D cell, the G cell, and the H cell needs to continue to communicate. When it is detected that the A cell stops communication, the cell A is stopped from being covered. At this time, the cell covered by the RIS has the D cell, G cell, and H cell. Further, it is realized that the communication coverage is performed on the cell having the communication requirement according to the communication requirement of each cell. Moreover, the coverage is directly paused for a target coverage cell that stops communication, thereby avoiding a waste of RIS base station coverage resources.

In the embodiment of the present disclosure, the communication wide-area coverage system based on the RIS technology provides a communication wide-area coverage manner based on the RIS technology. By calculating the relative position between the RIS base station and the target coverage cell in real time, the beam covering the target coverage cell is generated. When the distance between the target coverage cell and the RIS base station is small or when the communication rate is low, the wide beam is generated to realize area coverage. When the distance between the target coverage cell and the RIS base station is great or when the communication rate is high, the high-gain narrow beam is generated to realize beam scanning coverage, thereby realizing the simultaneous coverage of the plurality of terminals in the target coverage cell. Moreover, for the plurality of terminals in different target coverage cells, the wide-range and wide-area coverage is realized only based on one RIS base station through the fast beam scanning function and by using the communication manner where the time division is combined with the space division. In addition, based on the method, the RIS base station is constructed in the urban area, such that the signal enhancement can be effectively achieved. Moreover, the RIS base station is constructed in a remote area, such that the long-distance network coverage can be achieved. Therefore, the arrangement density of the base station is greatly lowered, and the base station construction and use cost is lowered.

Various embodiments in this specification are described in a progressive manner. Each embodiment focuses on the difference from other embodiments, and the same or similar parts between various embodiments may refer to each other.

The embodiments of the present disclosure are described with reference to flowcharts and/or block diagrams of the system and method according to the embodiments of the present disclosure. It should be understood that each process and/or block in the flowcharts and/or block diagrams, and a combination of processes and/or blocks in the flowcharts and/or block diagrams can be realized by computer program instructions. These computer program instructions can be provided to a processor of a general-purpose computer, a special-purpose computer, an embedded processor, or other programmable data processing terminal device to generate a machine, such that instructions executed by the processor of the computer or other programmable data processing terminal devices generate an apparatus for implementing functions specified in one or more processes in the flowchart and/or one or more blocks in the block diagram.

These computer program instructions can also be stored in a computer-readable memory that can guide a computer or other programmable data processing terminal devices to work in a specific manner, such that instructions stored in the computer-readable memory produce an article of manufacture including an instruction device. The instruction device implements functions specified in one or more processes in the flowchart and/or one or more blocks in the block diagram.

These computer program instructions can also be loaded on a computer or other programmable data processing terminal devices to enable a series of operation steps to be executed on the computer or other programmable terminal devices for producing computer-implemented processing, such that instructions executed on the computer or other programmable terminal devices provide steps for implementing functions specified in one or more processes in the flowchart and/or one or more blocks in the block diagram.

Although the preferred embodiments of the embodiments of the present disclosure have been described, those skilled in the art can make additional changes and modifications to these embodiments once the basic inventive concept is known. Therefore, the appended claims are intended to be construed as including the preferred embodiments and all changes and modifications falling within the scope of the embodiments of the present disclosure.

Further, it should be noted that relational terms herein, such as "first" and "second", are used only for differentiating one entity or operation from another entity or operation, which, however do not necessarily require or imply that there should be any real relationship or sequence between the entities or operations. Also, terms "have", "include" or any other variations thereof are meant to cover non-exclusive including, such that the process, method, article or terminal device including a series of elements do not only include those elements, but also include other elements that are not explicitly listed, or also include inherent elements of the process, method, article or terminal device. In a case that there are no more restrictions, an element qualified by the statement "includes a . . . " does not exclude the presence of additional identical elements in the process, method, article or terminal device that includes the said element.

The communication wide-area coverage system and method based on the RIS technology, the storage medium according to the embodiments of the present disclosure are described in detail above. Specific embodiments are used in the present disclosure to illustrate the principles and implementations of the present disclosure. The description of the above embodiments is only intended to facilitate understanding of the method of the present disclosure and its core concepts. Meanwhile, those skilled in the art can make modifications to specific implementations and change an application scope based on the concepts of the present disclosure. In summary, the contents of the specification shall not be construed as limitations of the present disclosure.

What is claimed is:

1. A communication wide-area coverage system based on reconfigurable intelligent surface (RIS) technology, the system comprising:
   a RIS base station, a phased-array antenna of the RIS base station being composed of a plurality of RIS units that are arranged periodically, and being controlled by a controller to generate a beam covering a target coverage cell;
   a communication board configured to obtain position coordinates of the target coverage cell, obtain a communication rate of the target coverage cell by establishing communication with the target coverage cell, and feed back the position coordinates and the communication rate of the target coverage cell to the controller;
   the controller configured to calculate a relative position between the target coverage cell and the RIS base station according to the position coordinates of the target coverage cell and the position coordinates of the RIS base station, and control the RIS base station to generate the beam according to the relative position and the communication rate of the target coverage cell; and
   a power supplier configured to supply power to the controller, the RIS base station, and the communication board.

2. A communication wide-area coverage method based on RIS technology, applied in a communication wide-area coverage system based on the RIS technology, wherein the communication wide-area system comprises a RIS base station, a communication board, a controller, and a power supplier, wherein a phased-array antenna of the RIS base station is composed of a plurality of RIS units that are arranged periodically, wherein the power supplier is configured to supply power to the controller, the RIS base station, and the communication board, and wherein the method comprises:
   obtaining, by the communication board, position coordinates of a target coverage cell, obtaining a communication rate of the target coverage cell by establishing communication with the target coverage cell, and feeding back the position coordinates and the communication rate of the target coverage cell to the controller, the target coverage cell being a cell having a communication requirement;
   calculating, by the controller, a relative position between the target coverage cell and the RIS base station according to the position coordinates of the target coverage cell and the position coordinates of the RIS base station, the relative position comprising a distance and an angle; and
   controlling, by the controller and according to the relative position between the target coverage cell and the RIS base station and the communication rate of the target coverage cell, the RIS base station to generate a beam covering the target coverage cell.

3. The method according to claim 2, wherein said controlling, by the controller and according to the relative position between the target coverage cell and the RIS base station and the communication rate of the target coverage cell, the RIS base station to generate the beam covering the target coverage cell comprises:
   controlling, in response to the relative position being smaller than a distance threshold or the communication rate being smaller than a rate threshold, the RIS base station to generate a wide beam; and
   controlling, in response to the relative position being greater than or equal to the distance threshold or the communication rate being greater than or equal to the rate threshold, the RIS base station to generate a narrow beam.

4. The method according to claim 2, further comprising:
   obtaining, by the communication board, the position coordinates of each of a plurality of target coverage cells and the communication rate of each of the plurality of target coverage cells, and feeding back, by the communication board, the position coordinates and the communication rate of each of the plurality of target coverage cells to the controller;
   calculating, by the controller, a relative position between each target coverage cell and the RIS base station according to the position coordinates of each target coverage cell and the position coordinates of the RIS base station; and
   controlling, according to different time slots based on the relative position between each target coverage cell and the RIS base station and the communication rate of each target coverage cell, the beam of the RIS base station to scan to different target coverage cells.

5. The method according to claim 4, further comprising:
   performing real-time detection, by the communication board, on a communication requirement of a non-target coverage cell;
   determining, in response to the non-target coverage cell having the communication requirement, the non-target coverage cell as the target coverage cell;
   feeding back the position coordinates and the communication rate of the target coverage cell to the controller;
   calculating, by the controller, the relative position between the target coverage cell and the RIS base station according to the position coordinates of the target coverage cell and the position coordinates of the RIS base station; and
   controlling, according to the relative position between the target coverage cell and the RIS base station and the communication requirement of the target coverage cell, the beam of the RIS base station to scan to the target coverage cell.

6. The method according to claim 4, further comprising:
   performing real-time detection, by the communication board, on the communication requirement of each target coverage cell;
   determining, in response to the target coverage cell requiring no communication, the target coverage cell as a non-target coverage cell, and feeding back the non-target coverage cell to the controller; and
   controlling, by the controller, the beam of the RIS base station to stop scanning to the non-target coverage cell.

7. The method according to claim 2, wherein:
   a phase of each RIS unit is adjusted according to the relative position between the target coverage cell and the RIS base station and the communication rate of the target coverage cell, to generate the beam covering the target coverage cell.

* * * * *